UNITED STATES PATENT OFFICE.

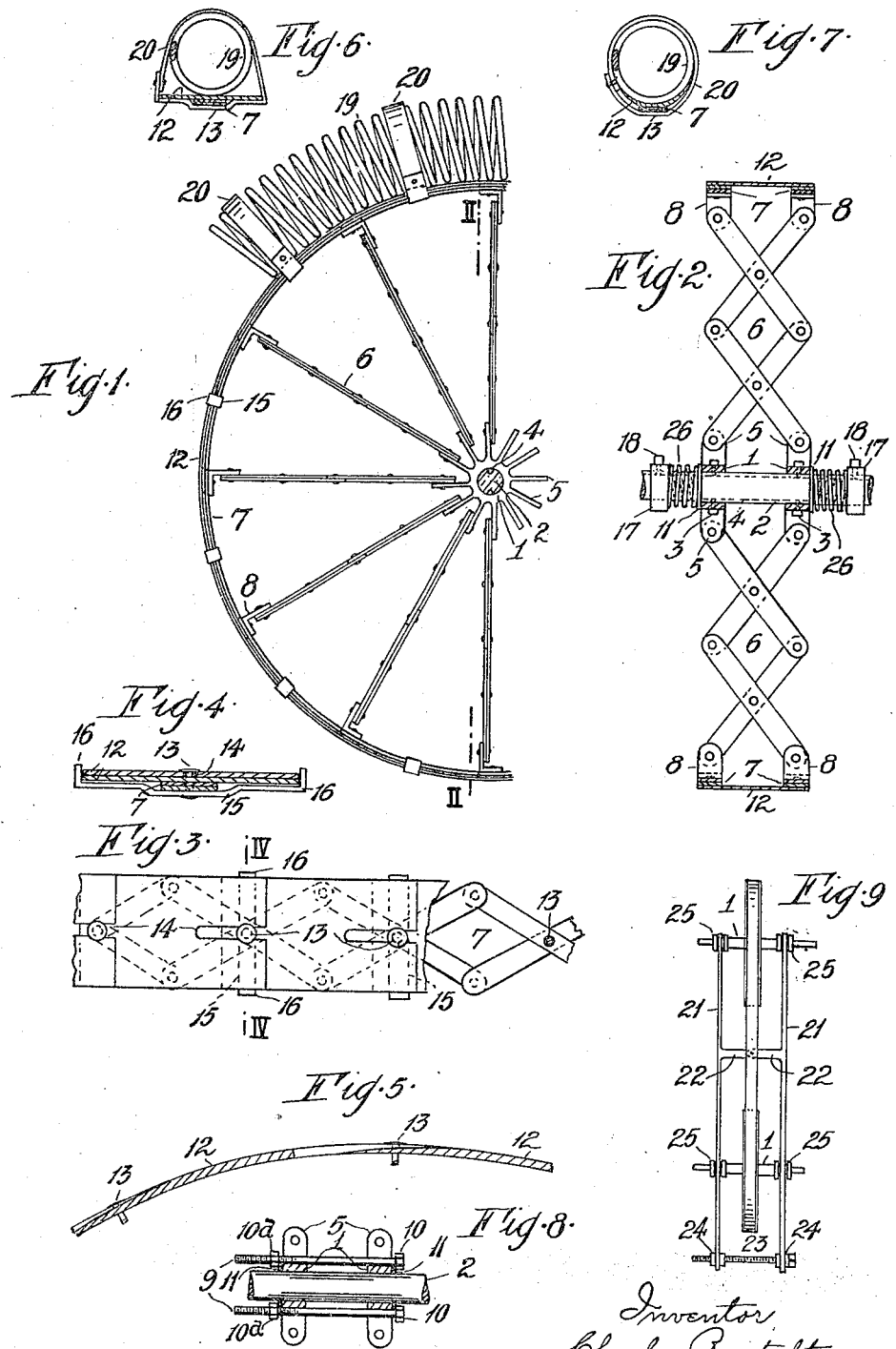

CHARLES BONTOFT, OF CHARTERS TOWERS, QUEENSLAND, AUSTRALIA.

WHEEL.

1,294,228.   Specification of Letters Patent.   Patented Feb. 11, 1919.

Application filed November 26, 1918. Serial No. 264,151.

*To all whom it may concern:*

Be it known that I, CHARLES BONTOFT, a subject of the King of Great Britain, residing at Vulture street, Charters Towers, Queensland, Australia, have invented certain new and useful Improvements in Wheels, of which the following is a specification.

This invention refers to wheels and consists of an improved construction whereby the size of the wheel may be varied within limits and said wheel may be rendered resilient.

The wheel is constructed with expansible and contractible spokes, the outer ends of the spokes being connected with an expansible and contractible rim provided with a telescopic periphery and with a spring tire if used for traction purposes.

The improved wheel is useful in a general way as for instance as a resilient pulley wheel operating to maintain belt tension or a pair of associated pulleys may be adjusted to vary speed of a shaft. A resilient wheel of this construction is useful for any vehicle and particularly as an air-craft landing wheel to absorb shock. In its simplest form the wheel can be quickly adjusted diametrically and consequently circumferentially to vary the size of the wheel.

A practical illustration of the invention is shown in the accompanying drawings whereof—

Figure 1 is a side elevation of half of the wheel showing a portion of a tire thereon;

Fig. 2 is a section on line II—II of Fig. 1;

Fig. 3 is a detail flattened plan view of a part of the periphery of the wheel without a tire;

Fig. 4 is an enlarged transverse section on line IV—IV of Fig. 3;

Fig. 5 is an enlarged longitudinal section of a portion of the periphery of the wheel;

Fig. 6 is a transverse section of the periphery with a tire; and

Fig. 7 is a similar view showing a modification of construction;

Fig. 8 is a sectional detail of a means for adjusting the distance between the hub sleeves;

Fig. 9 is a diagrammatic view illustrating means for simultaneously adjusting the size of two pulley wheels.

Referring to these drawings it will be seen that the hub is formed of two separated collars or sleeves 1 suitably keyed to the shaft or axle 2 to rotate therewith, by means for instance of bolts 3 passing through the hub sleeves into longitudinal grooves 4 formed in the axle or shaft which construction permits the sleeves 1 to slide longitudinally on the axle or shaft. If desired both sleeves may be mounted on a hub on the axle in which case the grooves 4 are formed in the hub. The sleeves are provided with radial lugs 5 attached thereto and to the same are pivoted the inner ends of lazy tong levers 6 formed of steel or like metal constituting the spokes of the wheel. The circumferential rim of the wheel is formed of lazy tong levers 7 similar to the spokes and joined in ring formation. To the outer pivots of these rim levers are connected knee pieces 8 to which the outer ends of the spoke levers are connected.

The sleeves may be adjustably locked against outward movement on the axle by means of bolts 9, Fig. 8 passing between the radial lugs 5 on the sleeves, the heads 10 and nuts 10$^a$ of said bolts bearing against the sleeves or washers 11 on the shaft. Said bolts are held against radial displacement by the inner ends of the spokes. By operating these bolts the distance between the sleeves may be varied, thus operating the lazy tong spokes to vary the size of the wheel.

The periphery of the wheel consists of a series of plates 12 lapping each other, the ends of said plates being tapered in thickness as illustrated in Fig. 5 to provide a comparatively continuous unbroken surface. These plates are mounted on the pivots 13 of the levers of the rim where said levers cross each other and each of said pivots project sufficiently to engage a longitudinal slot 14 formed in one end of the superposed plate. By means of this construction there is effected a telescopic action of these plates when the rim is expanded or contracted. In order to prevent lateral displacement of the plates retaining clips 15 are also connected to pivots 13 beneath the levers of the rim and are formed with out turned edges 16, Fig. 4.

When a resilient wheel is required the shaft is provided with springs 26 which act as buffers and abut against collars 17 adjustably fixed by bolts 18 to the shaft and against the outer sides of the sleeves 1 or washers at the side of same. Thus when the circumference of the wheel is shortened by shock the springs 26 are compressed and immediately afterward operate to lengthen the circumference of the wheel.

An endless spiral spring 19 capable of compression may be placed on the periphery when the wheel is used for traction purposes and in this case retaining clip bands 20 mounted on the pivots 13 are passed around the spring tire. This spring 19 moreover insures proper sliding action of the peripheral plates.

If desired the plates may be curved on their side edges as in Fig. 7 to form accommodating seatings for the tire.

Fig. 9 shows diagrammatically means for simultaneously varying the diameter of two pulley wheels around which a belt passes, the sleeves 1 of the wheels being connected with levers 21 having arms 22 pivoted for instance to each other and provided with means at their ends to operate the levers simultaneously. This may be accomplished by turning a screw 23 threaded through nuts 24 on the outer ends of the levers while the sleeves 1 may be extended and formed with collars 25 with which the levers engage.

I claim:—

1. An improved wheel provided with expansible and contractible spokes, and an expansible and contractible rim provided with a telescopic periphery for the purposes specified.

2. An improved wheel provided with metallic lazy tong lever spokes pivotally connected to a metallic circumferential lazy tong lever rim provided with a periphery composed of a series of telescopically connected metallic plates the inner ends of the levers of each spoke being respectively pivoted to hub sleeves longitudinally slidable on the axle or shaft of the wheel.

3. An improved wheel as set forth in claim 2 and in which the sleeves are keyed to the axle or shaft.

4. An improved wheel as set forth in claim 3 provided with springs operating against the outer ends of the sleeves.

5. An improved wheel as set forth in claim 2 and in which the peripheral plates are curved longitudinally and lapped and are connected to the pivots of the rim levers, said pivots projecting through longitudinal slots formed in said plates.

6. An improved wheel as set forth in claim 5 and in which both ends of each plate are tapered in thickness.

7. An improved wheel as set forth in claim 6 and in which transverse retaining clips are provided for the peripheral plates.

8. A wheel comprising an axle, hub sleeves keyed thereon, springs on the axle engaging the outer ends of the sleeves, lazy tong lever spokes connected to the sleeves, a circumferential lazy tong lever rim connected to the outer ends of the spokes, a plurality of overlapping longitudinally curved plates having tapered ends and slidably connected to the circumferential lever rim by the pivots of the latter projecting through slots in the ends of the plates.

9. An improved wheel as set forth in claim 2 and in which the hub sleeves and the ends of the rim levers are provided with lugs to which the respective ends of the spoke levers are pivotally connected substantially as illustrated.

10. An improved wheel as set forth in claim 2 provided with adjustable means for limiting the distance separating the hub sleeves.

11. An improved wheel as set forth in claim 1 provided with a tire consisting of an endless spiral spring compressible and expansible during contraction and expansion respectively of the diameter of the wheel.

12. An improved wheel as set forth in claim 11 and in which clip bands connected to the rim pass around the spring tire.

13. An improved wheel as set forth in claim 12 and in which the sides of the peripheral plates are curved to form a seating for the tire.

In testimony whereof I have hereunto set my hand.

CHARLES BONTOFT.

Copies of this patent may be obtained for five cents each, by addressing the "Commissioner of Patents, Washington, D. C."